(12) United States Patent
Hashimoto

(10) Patent No.: US 10,587,000 B2
(45) Date of Patent: Mar. 10, 2020

(54) NON-AQUEOUS ELECTROLYTE SECONDARY BATTERY

(71) Applicant: Sanyo Electric Co., Ltd., Daito-shi, Osaka (JP)

(72) Inventor: Kazuya Hashimoto, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 0 days.

(21) Appl. No.: 15/919,365

(22) Filed: Mar. 13, 2018

(65) Prior Publication Data

US 2018/0277883 A1    Sep. 27, 2018

(30) Foreign Application Priority Data

Mar. 27, 2017 (JP) ................. 2017-060407

(51) Int. Cl.
| | |
|---|---|
| *H01M 10/052* | (2010.01) |
| *H01M 10/0585* | (2010.01) |
| *H01M 10/0569* | (2010.01) |
| *H01M 4/36* | (2006.01) |
| *H01M 4/02* | (2006.01) |

(52) U.S. Cl.
CPC ......... *H01M 10/052* (2013.01); *H01M 4/364* (2013.01); *H01M 10/0569* (2013.01); *H01M 10/0585* (2013.01); *H01M 2004/027* (2013.01); *H01M 2004/028* (2013.01); *H01M 2300/0034* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

2016/0260965 A1*  9/2016  Wu ................. H01M 4/139

FOREIGN PATENT DOCUMENTS

| | | |
|---|---|---|
| JP | 2000-128539 A | 5/2000 |
| JP | 4965773 B2 | 7/2012 |

* cited by examiner

*Primary Examiner* — Robert S Carrico
(74) *Attorney, Agent, or Firm* — Westerman, Hattori, Daniels & Adrian LLP

(57) ABSTRACT

A non-aqueous electrolyte secondary battery has a positive electrode plate including a positive electrode active material mixture layer which contains as a positive electrode active material, a lithium transition metal composite oxide containing nickel; a negative electrode plate; a non-aqueous electrolyte including a lithium salt containing fluorine. In this non-aqueous electrolyte secondary battery, on a part of the positive electrode active material located as a surface of the positive electrode active material mixture layer, a first layer formed from nickel oxide and a second layer formed from nickel phosphate are provided in this order, the first layer has a thickness of 3 to 200 nm, and the second layer has a thickness of 1 to 50 nm.

2 Claims, 1 Drawing Sheet

NON-AQUEOUS ELECTROLYTE SECONDARY BATTERY

CROSS REFERENCE TO RELATED APPLICATIONS

The present invention application claims priority to Japanese Patent Application No. 2017-060407 filed in the Japan Patent Office on Mar. 27, 2017, the entire contents of which are incorporated herein by reference.

BACKGROUND OF THE INVENTION

Field of the Invention

The present invention relates to a non-aqueous electrolyte secondary battery.

Description of Related Art

As drive power sources of mobile information terminals, such as a mobile phone and a notebook personal computer, non-aqueous electrolyte secondary batteries, such as a lithium ion secondary battery, have been used. In addition, the non-aqueous electrolyte secondary batteries have also been used as drive power sources of electric vehicles (EV) and hybrid vehicles (HEV).

As a positive electrode active material of the non-aqueous electrolyte secondary battery, a lithium transition metal composite oxide containing at least one transition metal, such as nickel, cobalt, or manganese, has been used.

When the non-aqueous electrolyte secondary battery as described above is placed in a charged state and is stored for a long period, the transition metal in the positive electrode active material may be unfavorably eluted into an electrolyte solution in some cases. The elution of the transition metal from the positive electrode active material as described above is caused, for example, by hydrogen fluoride generated by a reaction between a fluorine-containing lithium salt, such as $LiPF_6$, contained in the non-aqueous electrolyte and water which is slightly present in a battery case.

The transition metal eluted from the positive electrode active material may be precipitated on a surface of a negative electrode plate in some cases, and when the transition metal thus precipitated may break through a separator disposed between a positive electrode plate and the negative electrode plate, a short circuit may be unfavorably generated therebetween in some cases.

As a method to prevent the elution of the transition metal from the positive electrode active material as described above, for example, Japanese Published Unexamined Patent Application No. 2000-128539 (Patent Document 1) has disclosed a technique in which LiF is applied to a surface of a positive electrode active material.

In addition, Japanese Patent No. 4965773 (Patent Document 2) has disclosed a technique in which a metal oxide is carried on a surface of a positive electrode active material.

BRIEF SUMMARY OF THE INVENTION

The present invention provides a non-aqueous electrolyte secondary battery which suppresses not only elution of at least one transition metal from a positive electrode active material but also an increase in resistance of a positive electrode plate.

A non-aqueous electrolyte secondary battery according to one aspect of the present invention comprises: a positive electrode plate including a positive electrode active material mixture layer which contains as a positive electrode active material, a lithium transition metal composite oxide containing nickel; a negative electrode plate; and a non-aqueous electrolyte including a lithium salt containing fluorine. In the non-aqueous electrolyte secondary battery described above, on a part of the positive electrode active material located as a surface of the positive electrode active material mixture layer, a first layer formed from nickel oxide and a second layer formed from nickel phosphate are provided in this order, the first layer has a thickness of 3 to 200 nm, and the second layer has a thickness of 1 to 50 nm.

Since a layer formed from nickel oxide having a low activity is provided on the surface of the positive electrode active material, in particular, on the surface of the part of the positive electrode active material located as the surface of the positive electrode active material mixture layer, for example, even if hydrogen fluoride is present in the battery, the reaction between the positive electrode active material and hydrogen fluoride can be suppressed. Hence, even when the non-aqueous electrolyte secondary battery is left in a charged state, the elution of at leas one transition metal from the positive electrode active material can be suppressed.

However, the present inventors found that when a layer formed from nickel oxide (NiO) is provided on the surface of the positive electrode active material, a new problem may occurs. When a lithium transition metal composite oxide containing nickel is contained as the positive electrode active material, since nickel dioxide ($NiO_2$) present in the positive electrode active material is reduced during charge into nickel oxide (NiO) which has no contribution to charge/discharge, the thickness of NiO formed on the surface of the positive electrode active material is increased more than necessary. As a result, the resistance of the positive electrode plate is increased, and the output performance of the non-aqueous electrolyte secondary battery is disadvantageously degraded.

Through various studies carried out by the present inventors, it was found that when the second layer formed from nickel phosphate is further provided on the first layer formed from nickel oxide provided on the surface of the positive electrode active material, while the elution of the transition metal from the positive electrode active material is suppressed, the increase in thickness of the first layer formed from nickel oxide can be suppressed, and at the same time, the increase in resistance of the positive electrode plate can also be suppressed. Without disturbing the effect of suppressing the elution of the transition metal obtained by the first layer formed from nickel oxide, the second layer formed from nickel phosphate suppresses the increase in thickness of the first layer formed from nickel oxide when the battery is stored in a charged state, the nickel oxide functioning as a resistance component on the surface of the positive electrode active material.

In addition, the thickness of the first layer and the thickness of the second layer are set to 3 to 200 nm and 1 to 50 nm, respectively. Since the thicknesses of the first layer and the second layer are each set in the range described above, the elution of the transition metal from the positive electrode active material can be sufficiently suppressed, and even under a low temperature condition after the battery is charged, the resistance can be sufficiently decreased.

In addition, the surfaces of positive electrode active material particles are not required to be fully covered with the first layer and the second layer. In addition, every positive electrode active material particle contained in the positive electrode active material mixture layer is not required to be provided with the first layer and the second layer. In the present invention, at least on the surfaces of positive electrode active material particles each present as the surface of the positive electrode active material mixture layer, the first layer and the second layer are preferably provided. In addition, at least in the positive electrode active material mixture layer, on positive electrode active material particles exposed to the outside, the first layer and the second layer are preferably provided. The reason for this is that the amount of the transition metal eluted from positive electrode active material particles located as the surface of the positive electrode active material mixture layer is relatively larger than the amount of the transition metal eluted from positive electrode active material particles located in the positive electrode active material mixture layer.

On the surface of the positive electrode active material mixture layer, the first layer and the second layer are preferably formed.

The thickness of the first layer is preferably larger than the thickness of the second layer.

Accordingly, the present invention provides a non-aqueous electrolyte secondary battery which suppresses not only the elution of at least one transition metal from a positive electrode active material but also the increase in resistance of a positive electrode plate.

DETAILED DESCRIPTION OF THE INVENTION

The structure of a non-aqueous electrolyte secondary battery and a manufacturing method thereof according to embodiments of the present invention will be described. In addition, the present invention is not limited to the following embodiments.

[Formation of Positive Electrode Plate]

A lithium nickel cobalt manganese composite oxide ($LiNi_{0.35}Co_{0.35}Mn_{0.30}O_2$) as a positive electrode active material, a poly(vinylidene fluoride) as a binding agent, carbon black as an electrically conductive agent, and N-methyl-2-pyrollidone as a dispersant were kneaded together to form a positive electrode active material mixture layer slurry. In this step, the mass ratio of the lithium nickel cobalt manganese composite oxide, the poly(vinylidene fluoride), and the carbon black was set to 95:3:2. Next, after the positive electrode active material mixture layer slurry was applied to two surfaces of aluminum foil (thickness: 15 μm) used as a positive electrode core, N-methyl-2-pyrollidone used as the dispersant was removed, so that positive electrode active material mixture layers were formed on the positive electrode core. Subsequently, rolling was performed using a rolling roller machine so that the positive electrode active material mixture layers each had a packing density of 2.8 g/cm$^3$. Accordingly, a positive electrode plate was obtained. This positive electrode plate was cut to have a predetermined shape.

Figure 1:
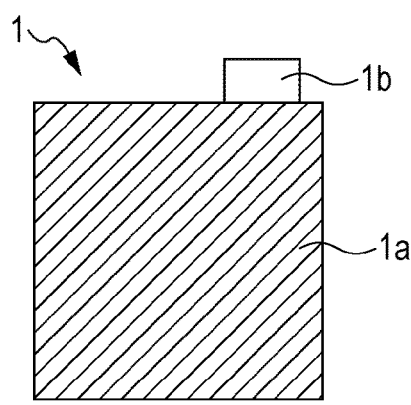
FIG. 1 is a plan view of a positive electrode plate according to an embodiment.

FIG. 1 is a plan view of a positive electrode plate 1. The positive electrode plate 1 is formed so that positive electrode active material mixture layers 1a are provided on two surfaces of a square-shaped positive electrode core. In addition, the positive electrode plate 1 has a positive electrode core exposing portion 1b at an end portion thereof. In the positive electrode plate 1, the size of a portion at which the positive electrode active material mixture layer 1a was formed was set to 10 cm×12 cm.

[Formation of First Layer]

On each of the positive electrode active material mixture layers 1a of the positive electrode plate 1 formed by the method described above, a first layer formed from nickel oxide having a thickness of 3 nm was formed by an RF magnetron sputtering method under the following conditions.

Target: nickel oxide (NiO)
Target size: 4-inch diameter
Sputtering gas: Ar gas/$O_2$ gas=80/20 (volume ratio)
10 sccm, 1.2 Pa
Sputtering power: 60 W

[Formation of Second Layer]

Next, on the first layer formed on the positive electrode active material mixture layer 1a, a second layer formed from nickel phosphate having a thickness of 1 nm was formed by an RF magnetron sputtering method under the following conditions.

Target: nickel phosphate hydrate ($Ni_3(PO_4)_2 \cdot 5H_2O$)
Target size: 4-inch diameter
Sputtering gas: Ar gas/$O_2$ gas=100/0 (volume ratio)
10 sccm, 1.0 Pa
Sputtering power: 60 W In addition, after the positive electrode plate 1 was buried in a resin, a cross-sectional polishing treatment was performed, and the thicknesses of the first layer and the second layer were measured using a transmission type electron microscope.

[Formation of Negative Electrode Plate]

Graphite (average particle diameter: 15 μm) as a negative electrode active material, a styrene-butadiene rubber (SBR) as a binding agent, a carboxymethyl cellulose (CMC) as a thickening agent, and water as a dispersant were kneaded together at a mass ratio of graphite, SBR, and CMC of 98:1:1, so that a negative electrode active material mixture layer slurry was formed.

To two surfaces of copper foil having a thickness of 10 μm which was used as a negative electrode core, the negative electrode active material mixture layer slurry was applied by a die coater. Subsequently, the negative electrode active material mixture layer slurry was dried, so that water in the negative electrode active material mixture layer slurry was removed. Accordingly, negative electrode active material mixture layers were formed. Next, the negative electrode active material mixture layers were processed by a compression treatment using a compression roller machine so as to obtain a packing density of 1.6 g/cm$^3$. Accordingly, a negative electrode plate was obtained. This negative electrode plate was cut to have a predetermined shape.

Figure 2:
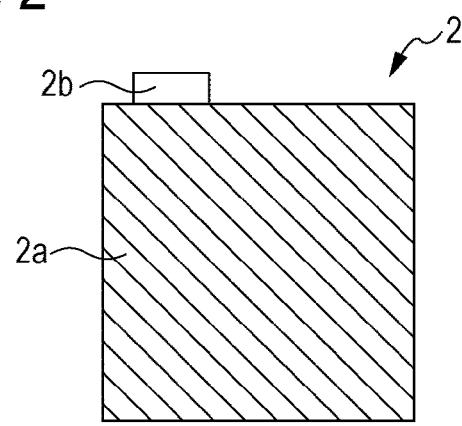
FIG. 2 is a plan view of a negative electrode plate according to the embodiment.

FIG. 2 is a plan view of a negative electrode plate 2. The negative electrode plate 2 is formed so that negative electrode active material mixture layers 2a are provided on two surfaces of a square-shaped negative electrode core. In addition, the negative electrode plate 2 has a negative electrode core exposing portion 2b at an end portion thereof. In the negative electrode plate 2, the size of a portion at which the negative electrode active material mixture layer 2a was formed was set to 10.2 cm×12.2 cm.

[Formation of Electrode Body]

The positive electrode plate 1 formed by the method described above and the negative electrode plate 2 formed by the method described above were laminated to each other with a polyolefin-made separator having a thickness of 12 μm interposed therebetween to form an electrode body. In addition, a positive electrode lead 3 was connected to the positive electrode core exposing portion 1b of the positive electrode plate 1 by welding. In addition, a negative electrode lead 4 was connected to the negative electrode core exposing portion 2b of the negative electrode plate 2 by welding

[Preparation of Non-Aqueous Electrolyte Solution]

A mixed solvent obtained by mixing ethylene carbonate (EC), ethyl methyl carbonate (EMC), and diethyl carbonate (DEC) at a volume ratio (25° C., 1 atmospheric pressure) of 25:35:40 was formed. To this mixed solvent, $LiPF_6$ was added to have a concentration of 1 mol/L, lithium bis (oxalato)borate was added to have a concentration of 0.1 mol/L, and lithium difluorophosphate was added to have a concentration of 0.05 mol/L. Furthermore, vinylene carbonate (VC) was added to have a concentration of 0.8 percent by mass with respect to the total mass of the non-aqueous electrolyte solution, so that a non-aqueous electrolyte solution was prepared.

[Assembly of Battery]

Figure 3:
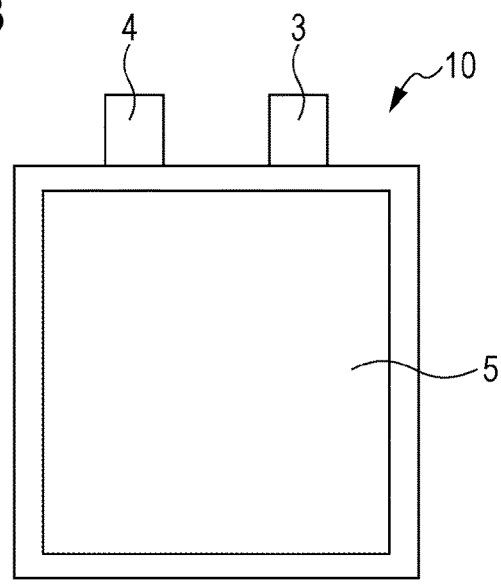
FIG. 3 is a plan view of a non-aqueous electrolyte secondary battery according to the embodiment.

After the electrode body formed by the method described above and the non-aqueous electrolyte solution thus prepared were disposed in a laminate exterior package 5 having a bag shape, the laminate exterior package 5 was sealed so that the positive electrode lead 3 and the negative electrode lead 4 were projected out of the laminate exterior package 5, so that a non-aqueous electrolyte secondary battery 10 of Example 1 was formed. FIG. 3 is a plan view of the non-aqueous electrolyte secondary battery 10.

Examples 2 to 4 and Comparative Examples 1 to 7

Except that the thickness of the first layer and the thickness of the second layer were changed, non-aqueous electrolyte secondary batteries of Examples 2 to 4 and Comparative Examples 1 to 7 were each formed by a method similar to that for the non-aqueous electrolyte secondary battery 10 of Example 1. In addition, the thickness of the first layer and the thickness of the second layer of the non-aqueous electrolyte secondary battery of each of Examples 1 to 4 and Comparative Examples 1 to 7 are as shown in Table 1. In Table 1, when the thickness of the second layer is represented by 0 nm, this case indicates that the second layer is not provided.

The following tests were performed on each of the non-aqueous electrolyte secondary batteries of Examples 1 to 4 and Comparative Examples 1 to 7.

<Measurement of Elution Amount of Transition Metals>

The non-aqueous electrolyte secondary battery was charged at a constant current (650 mA) and a constant voltage (4.25 V, 33 mA) under a condition at 25° C. and was then float-charged (constant voltage; 4.25 V) at 60° C. for 72 hours.

Subsequently, the non-aqueous electrolyte secondary battery was discharged at a constant current (650 mA) until the state of charge (SOC) reached 0%. Next, the non-aqueous electrolyte secondary battery was disassembled, and a portion of the negative electrode plate at which the negative electrode active material mixture layers were formed was cut to obtain two pieces each having an area of 10 $cm^2$ (two surfaces thereof were each covered with the mixture layer), and those two pieces were dissolved in HCl.

In addition, a solution into which the negative electrode active material mixture layers were dissolved was processed by an induced coupled plasma measurement (using an ICP apparatus manufactured by Shimadzu Corporation, trade name: ICPS-8100) to measure the amount of transition metals (Ni, Co, and Mn), and the amount thus obtained was regarded as the elution amount of the transition metals from the positive electrode active material. In addition, the elution amount was obtained by calculation as the elution amount per one mole of the positive electrode active material.

<Measurement of Change in Thickness of First Layer by Float Charge>

The non-aqueous electrolyte secondary battery was charged at a constant current (650 mA) and a constant voltage (4.25 V, 33 mA) under a condition at 25° C. and was then float-charged (constant voltage; 4.25 V) at 60° C. for 72 hours.

Subsequently, the non-aqueous electrolyte secondary battery was discharged at a constant current (650 mA) until the state of charge (SOC) reached 0%. Next, the non-aqueous electrolyte secondary battery was disassembled, and the positive electrode plate was cut to obtain a piece having an area of 10 $cm^2$ and was used as a test sample.

After this test sample was buried in a resin, a cross-sectional polishing treatment was performed, and the thickness of the first layer was measured using a transmission type electron microscope.

<Measurement of Output Resistance Under Low Temperature Condition after Float Charge>

The non-aqueous electrolyte secondary battery was charged until the state of charge (SOC) reached 50% under a condition at 25° C. Next, under a condition at −35° C., discharge was performed for 10 seconds at currents of 1 C, 2 C, 5 C, 10 C, 15 C, 20 C, 25 C, and 30 C, and the battery voltages obtained thereby were measured and then plotted with respect to the respective currents, so that the resistance during the discharge was obtained.

The measurement results of the non-aqueous electrolyte secondary batteries of Examples 1 to 4 and Comparative Examples 1 to 7 are shown in Table 1.

TABLE 1

| | THICKNESS OF FIRST LAYER (nm) | THICKNESS OF SECOND LAYER (nm) | THICKNESS OF FIRST LAYER AFTER CHARGE (nm) | ELUTION AMOUNT OF TRANSITION METALS (×10³ ppm/mol) | LOW-TEMPERATURE RESISTANCE AFTER CHARGE (Ω) |
|---|---|---|---|---|---|
| COMPARATIVE EXAMPLE 1 | 3 | 0 | 2100 | 2.3 | 5.85 |

TABLE 1-continued

|  | THICKNESS OF FIRST LAYER (nm) | THICKNESS OF SECOND LAYER (nm) | THICKNESS OF FIRST LAYER AFTER CHARGE (nm) | ELUTION AMOUNT OF TRANSITION METALS (×10³ ppm/mol) | LOW-TEMPERATURE RESISTANCE AFTER CHARGE (Ω) |
|---|---|---|---|---|---|
| COMPARATIVE EXAMPLE 2 | 2 | 1 | 2 | 8.4 | 5.37 |
| EXAMPLE 1 | 3 | 1 | 3 | 3.5 | 5.41 |
| EXAMPLE 2 | 200 | 1 | 200 | 2.9 | 5.43 |
| COMPARATIVE EXAMPLE 3 | 250 | 1 | 250 | 2.7 | 5.77 |
| COMPARATIVE EXAMPLE 4 | 2 | 50 | 2 | 8.3 | 5.39 |
| EXAMPLE 3 | 3 | 50 | 3 | 3.6 | 5.40 |
| EXAMPLE 4 | 200 | 50 | 200 | 2.9 | 5.43 |
| COMPARATIVE EXAMPLE 5 | 250 | 50 | 250 | 2.8 | 5.79 |
| COMPARATIVE EXAMPLE 6 | 3 | 75 | 3 | 3.4 | 5.86 |
| COMPARATIVE EXAMPLE 7 | 200 | 75 | 200 | 2.8 | 5.91 |

As is the case of Comparative Example 1, when the second layer formed from nickel phosphate is not provided although the first layer formed from nickel oxide is provided on the surface of the positive electrode active material mixture layer, the thickness of the first layer is increased after the charge. The reason for this is believed as described below. That is, if the second layer formed from nickel phosphate is not present on the first layer formed from nickel oxide, in the case in which a lithium transition metal oxide containing nickel is used as the positive electrode active material, nickel dioxide present in the positive electrode active material is reduced into nickel oxide during the charge, and as a result, the thickness of the first layer is increased more than necessary. Since the thickness of the first layer is increased, the elution of the transition metals from the positive electrode active material can be suppressed; however, it is believed that since the thickness of the first layer formed from nickel oxide is increased more than necessary, the resistance under a low temperature condition is remarkably increased.

In addition, as is the case of Examples 1 to 4 and Comparative Examples 2 to 7, when the first layer formed from nickel oxide and the second layer formed from nickel phosphate are provided in this order on the positive electrode active material mixture layer, the thickness of the first layer is not changed after the charge. The reason for this is believed that the second layer formed from nickel phosphate suppresses nickel dioxide present in the positive electrode active material from being reduced.

As is the case of Comparative Examples 2 and 4, when the thickness of the first layer formed from nickel oxide is 2 nm, the elution amount of the transition metals from the positive electrode active material is 8.4 (×10³ ppm/mol) or 8.3 (×10³ ppm/mol), and the elution cannot be sufficiently suppressed. On the other hand, as is the case of Examples 1 and 3, when the thickness of the first layer formed from nickel oxide is 3 nm, the elution amount of the transition metals from the positive electrode active material can be decreased to 3.5 (×10³ ppm/mol) or 3.6 (×10³ ppm/mol). Hence, the thickness of the first layer formed from nickel oxide is set to 3 nm or more.

In addition, as is the case of Comparative Examples 3 and 5, when the thickness of the first layer formed from nickel oxide is 250 nm, the resistance under a low temperature condition after the charge is high, such as 5.77 (Ω) or 5.79 (Ω). On the other hand, as is the case of Examples 2 and 4, when the thickness of the first layer formed from nickel oxide is 200 nm, the resistance under a low temperature condition after the charge can be decreased to 5.43 (Ω). Hence, the thickness of the first layer formed from nickel oxide is set to 200 nm or less.

As is the case of Comparative Example 1, when the second layer formed from nickel phosphate is not provided, the resistance under a low temperature condition after the charge is high, such as 5.85 (Ω). On the other hand, as is the case of Example 1, when the thickness of the second layer formed from nickel phosphate is 1 nm, the resistance under a low temperature condition after the charge can be decreased to 5.41 (Ω). Hence, the thickness of the second layer formed from nickel phosphate is set to 1 nm or more.

As is the case of Comparative Examples 6 and 7, when the thickness of the second layer formed from nickel phosphate is 75 nm, the resistance under a low temperature condition after the charge is high, such as 5.86 (Ω) or 5.91 (Ω). On the other hand, as is the case of Examples 3 and 4, when the thickness of the second layer formed from nickel phosphate is 50 nm, the resistance under a low temperature condition after the charge can be decreased to 5.40 (Ω) or 5.43 (Ω). Hence, the thickness of the second layer formed from nickel phosphate is set to 50 nm or less.

As is the case of Examples 1 to 4, when the first layer formed from nickel oxide and the second layer formed from nickel phosphate are provided on the surface of the positive electrode active material present as the surface of the positive electrode mixture layer, the thickness of the first layer formed from nickel oxide is 3 to 200 nm, and the thickness of the second layer formed from nickel phosphate is 1 to 50 nm, the elution of the transition metals from the positive electrode active material can be suppressed, and in addition, the resistance under a low temperature condition after the float charge can be suppressed from being increased. That is, by the first layer formed from nickel oxide provided on the surface of the positive electrode active material, the elution of the transition metals from the positive electrode active material can be suppressed. In addition, since the second layer formed from nickel phosphate is provided on the first layer formed from nickel oxide, the increase in thickness of nickel oxide during the charge can be suppressed. Accordingly, the increase in resistance under a low temperature condition after the float charge can be suppressed.

In the above embodiment, the case in which after the positive electrode active material mixture layer is formed, the first layer formed from nickel oxide and the second layer formed from nickel phosphate are provided on the surface of the positive electrode active material present as the surface of the positive electrode active material mixture layer has been described by way of example. As another method, after the first layer formed from nickel oxide and the second layer formed from nickel phosphate are provided on the surface of the positive electrode active material, by the use of the positive electrode active material on which the first layer and the second layer are provided, the positive electrode active material mixture layer may also be formed.

When the positive electrode active material mixture layer is formed using the positive electrode active material provided with the first layer and the second layer, the first layer and the second layer are also provided on the surface of the positive electrode active material present in the positive electrode active material mixture layer. Hence, the elution of the transition metals from the positive electrode active material can be more effectively suppressed.

In addition, after the positive electrode active material mixture layer is formed, when the first layer and the second layer are formed on the surface of the positive electrode active material mixture layer, a positive electrode plate having a lower resistance can be obtained.

By the embodiment described above, the case in which the first layer and the second layer are provided on the positive electrode active material by a sputtering method has been described by way of example. As another method, for example, a pulsed laser deposition (PLD) method may also be mentioned.

<Others>

As the materials of the positive electrode plate, the negative electrode plate, the separator, the non-aqueous electrolyte, and the like, known materials which have been used for related non-aqueous electrolyte secondary batteries may be used.

As the positive electrode active material, a lithium transition metal composite oxide containing nickel is used. As the lithium transition metal composite oxide containing nickel, for example, lithium nickelate, a lithium nickel manganese composite oxide, a lithium nickel cobalt composite oxide, or a lithium nickel cobalt manganese composite oxide may be mentioned. In addition, a compound obtained by adding Al, Ti, Zr, W, Nb, B, Mg, Mo, and/or the like to the above lithium transition metal composite oxide may also be used. In addition, the amount of nickel contained in the lithium transition metal composite oxide with respect to the total mass of the transition metals contained therein is preferably 20 percent by mole or more and more preferably 30 percent by mole or more.

As the negative electrode active material, a carbon material capable of occluding and releasing lithium ions is preferably used. As the carbon material capable of occluding and releasing lithium ions, for example, graphite, hardly graphitizable carbon, easily graphitizable carbon, fiber-shaped carbon, coke, and carbon black may be mentioned. Among those materials mentioned above, in particular, graphite is preferable. Furthermore, as a non-carbon material, for example, silicon, tin, or an alloy or an oxide primarily formed therefrom may be mentioned.

As the binding agent contained in the positive electrode active material mixture layer, for example, a fluorine-based resin, such as polytetrafluoroethylene (PTFE) or a poly (vinylidene fluoride) (PVdF); a polyacrylonitrile (PAN), a polyimide resin, an acrylic resin, and a polyolefin resin may be mentioned. In addition, besides those resins, a carboxymethyl cellulose (CMC), a salt thereof (such as CMC-Na, CMC-K, CMC-NH$_4$, or a partially neutralized salt thereof), or a poly(ethylene oxide) (PEO) may be used.

As the binding agent contained in the negative electrode active material mixture layer, for example, there may be used a styrene-butadiene rubber (SBR), a carboxymethyl cellulose (CMC) or a salt thereof, a polyacrylic acid (PAA) or a salt thereof (such as a PAA-Na, PAA-K, or a partially neutralized salt thereof), or a poly(vinyl alcohol) (PVA) may be used.

As the positive electrode core, metal foil is preferably used. For example, aluminum foil or aluminum alloy foil is preferably used. As the negative electrode core, metal foil is preferably used. For example, copper foil or copper alloy foil is preferably used.

As a non-aqueous solvent (organic solvent) of the non-aqueous electrolyte, for example, a carbonate, a lactone, an ether, a ketone, or an ester may be used. At least two types of those solvents may be used in combination.

As an electrolyte salt, a lithium salt is preferable. As the lithium salt, a salt which has been generally used as a supporting salt of a related non-aqueous electrolyte secondary battery may be used. For example, there may be mentioned a lithium salt containing fluorine, such as LiBF$_4$, LiPF$_6$, LiAsF$_6$, LiSbF$_6$, LiCF$_3$SO$_3$, LiC(C$_2$F$_5$SO$_2$), LiCF$_3$CO$_2$, Li(P(C$_2$O$_4$)F$_4$), Li(P(C$_2$O$_4$)F$_2$), LiPF$_{6-x}$(C$_n$F$_{2n+1}$) (1≤x≤6, and n indicates 1 or 2); a boric acid salt, such as Li(B(C$_2$O$_4$)F$_2$); an imide salt, such as LiN(FSO$_2$)$_2$ or LiN(C$_1$F$_{2l+1}$SO$_2$)(C$_m$F$_{2m+1}$SO$_2$) {l and m each indicate an integer of 1 or more}; or Li$_x$P$_y$O$_z$F$_\alpha$ {x indicates an integer of 1 to 4, y indicates 1 or 2, z indicates an integer of 1 to 8, and α indicates an integer of 1 to 4}. Among those compounds mentioned above, for example, LiPF$_6$ or Li$_x$P$_y$O$_z$F$_\alpha$ {x indicates an integer of 1 to 4, y indicates 1 or 2, z indicates an integer of 1 to 8, and α indicates an integer of 1 to 4} is preferable. As Li$_x$P$_y$O$_z$F$_\alpha$, for example, lithium monofluorophosphate or lithium difluorophosphate may be mentioned. The lithium salts may be used alone, or at least two types thereof may be used in combination.

As the separator, a polyolefin-made porous separator is preferably used.

Although the shape of the battery is not particularly limited, for example, there may be used a cylindrical battery or a square battery using an external package can. While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A non-aqueous electrolyte secondary battery comprising:
    a positive electrode plate including a positive electrode active material mixture layer which contains as a positive electrode active material, a lithium transition metal composite oxide containing nickel;
    a negative electrode plate;
    a non-aqueous electrolyte including a lithium salt containing fluorine,
    wherein on a part of the positive electrode active material located as a surface of the positive electrode active material mixture layer, a first layer formed from nickel oxide and a second layer formed from nickel phosphate are provided in this order, the first layer has a thickness of 3 to 200 nm, the second layer has a thickness of 1 to 50 nm, and wherein the thickness of the first layer is larger than the thickness of the second layer.

2. The non-aqueous electrolyte secondary battery according to claim 1, wherein the first layer and the second layer are provided on the surface of the positive electrode active material mixture layer.

* * * * *